United States Patent
Liu et al.

(10) Patent No.: US 9,386,594 B2
(45) Date of Patent: Jul. 5, 2016

(54) DOWNLINK TRANSMISSION COORDINATED SCHEDULING

(75) Inventors: Jinhua Liu, Beijing (CN); Muhammad Kazmi, Bromma (SE); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 14/356,537

(22) PCT Filed: Nov. 11, 2011

(86) PCT No.: PCT/CN2011/082093
§ 371 (c)(1),
(2), (4) Date: May 6, 2014

(87) PCT Pub. No.: WO2013/067709
PCT Pub. Date: May 16, 2013

(65) Prior Publication Data
US 2014/0286295 A1      Sep. 25, 2014

(30) Foreign Application Priority Data

Nov. 7, 2011    (WO) ................ PCT/CN2011/081863

(51) Int. Cl.
*H04W 4/00*     (2009.01)
*H04W 72/10*    (2009.01)
*H04W 72/12*    (2009.01)

(52) U.S. Cl.
CPC .......... *H04W 72/10* (2013.01); *H04W 72/1242* (2013.01); *H04W 72/1273* (2013.01)

(58) Field of Classification Search
USPC .......... 370/235–329, 338–341; 455/450–455, 455/509–524
See application file for complete search history.

(56) References Cited

U.S. PATENT DOCUMENTS

| 8,150,412 B2 * | 4/2012 | Cheng ................... H04W 16/04 370/278 |
| 8,190,168 B2 * | 5/2012 | Wong .................. H04W 72/121 370/329 |

(Continued)

FOREIGN PATENT DOCUMENTS

| CN | 101400139 A | 4/2009 |
| CN | 102104963 A | 6/2011 |

(Continued)

OTHER PUBLICATIONS

Communication with Supplementary Partial European Search Report, EP Application No. 11875364.9, Apr. 30, 2015.

(Continued)

*Primary Examiner* — Man Phan
(74) *Attorney, Agent, or Firm* — Myers Bigel & Sibley, P.A.

(57) ABSTRACT

A method of coordinated scheduling of a downlink transmission flow from a first radio network node to a user equipment UE in a second radio network node. The method includes scheduling the downlink transmission flow so that the in-sequence delivery of the received data blocks can be kept in an acceptable level in the UE by adjusting a scheduling priority of the downlink transmission flow in the second radio network node. The method may further include estimating one or more buffer-related parameters based on buffered data for the downlink transmission flow from the first radio network node, and determining, based on the estimated one or more buffer-related parameter and/or one or more parameters associated with the operation status of the second radio network node, if the in-sequence delivery of the received data blocks to higher layers can be in an acceptable level in the UE.

26 Claims, 7 Drawing Sheets

(56) References Cited

U.S. PATENT DOCUMENTS

| | | | |
|---|---|---|---|
| 8,244,266 B2* | 8/2012 | Song | H04L 1/0002 370/264 |
| 8,542,640 B2* | 9/2013 | Ramprashad | H04W 16/10 370/329 |
| 8,867,442 B2* | 10/2014 | Pelletier | H04W 76/048 370/328 |
| 8,903,408 B2* | 12/2014 | Tian | H04B 7/024 370/328 |
| 9,042,927 B2* | 5/2015 | Gao | H04B 7/024 455/450 |
| 9,077,404 B2* | 7/2015 | Jia | H04B 7/024 |
| 9,107,107 B2* | 8/2015 | Falconetti | H04W 28/18 |
| 2008/0298486 A1* | 12/2008 | Venturino | H04L 5/0007 375/260 |
| 2009/0116389 A1* | 5/2009 | Ji | H04W 28/16 370/235 |
| 2010/0284346 A1* | 11/2010 | Rudrapatna | H04W 72/1247 370/329 |

FOREIGN PATENT DOCUMENTS

| | | |
|---|---|---|
| WO | WO 2010/130277 A1 | 11/2010 |
| WO | WO 2010/132199 A1 | 11/2010 |

OTHER PUBLICATIONS

Communication pursuant to Article 94(3) EPC, EP Application No. 11875364.9, Jun. 2, 2015.

Alcatel-Lucent et al., "Discussion on Skewed Packet Reception in HSDPA Multipoint Transmission", Agenda item: 10.4, Document for: Discussion and Decision, 3GPP TSG-RAN WG2 Meeting #75, R2-114081, Athens, Greece, Aug. 22-26, 2011, 2 pp.

Nokia Siemens Networks et al., "Multi-cell Transmission techniques for HSDPA" Agenda item: 5.6, Document for: Discussion, 3GPP TSG-RAN WG1 Meeting #62, R1-104913, Madrid, España, Aug. 23-27, 2010, 10 pp.

Qualcomm Incorporated, "DL Scheduling, RLC and Flow Control assumption for Inter-NodeB Multi-Point Transmissions", Agenda item: 5.4, Document for: Discussion, 3GPP TSG RAN WG1 Meeting #63, R1-110126, Dublin, Ireland, Jan. 17-21, 2011, 9 pp.

Qualcomm Incorporated, "Impact to RAN protocol architecture and UTRAN implementation due to Multiflow HSDPA MP-TX schemes", Agenda Item: 10.4, Document for: Discussion, 3GPP TSG RAN WG1 Meeting #74, R2-112849, Barcelona, Spain, May 9-13, 2001, 9 pp.

Qualcomm Incorporated, "TCP Performance Evaluation of SF-DC Inter NodeB Aggregation Assuming Realistic RLC, Flow Control and Iub Congestions Control", Agenda Item: 5.5.2, Document for: Discussion, 3GPP TSG RAN WG1 Meeting #66, R1-112686, Athens, Greece, Aug. 22-26, 2011, 10 pp.

International Search Report for PCT Application No. PCT/CN2011/082093, mailed Aug. 16, 2012, 3 pages.

Written Opinion of the International Searching Authority for PCT Application No. PCT/CN2011/082093, mailed Aug. 16, 2012, 4 pages.

3GPP TR 25.872 V11.0.0 (Sep. 2011); $3^{rd}$ Generation Partnership Project; Technical Specification Group Radio Access Network; High Speed Packet Access (HSDPA) multipoint transmission (Release 11); $3^{rd}$ Generation Partnership Project; 650 Route des Lucioles—Sophia Antipolis Valbonne—France; 29 pages.

3GPP TR 36.819 V11.0.0 (Sep. 2011); $3^{rd}$ Generation Partnership Project; Technical Specification Group Radio Access Network; Coordinated multi-point operation for LTE physical layer aspects (Release 11); $3^{rd}$ Generation Partnership Project; 650 Route des Lucioles—Sophia Antipolis Valbonne—France; 68 pages.

* cited by examiner

United States Patent US 9,386,594 B2

DOWNLINK TRANSMISSION COORDINATED SCHEDULING

CROSS REFERENCE TO RELATED APPLICATION

This application is a 35 U.S.C. §371 national stage application of PCT International Application No. PCT/CN2011/082093, filed on 11 Nov. 2011, which itself claims priority to International PCT Application No. PCT/CN2011/081863, filed 7 Nov. 2011, the disclosures of which are incorporated by reference herein in their entireties. The above-referenced PCT International Application was published in the English language as International Publication No. WO 2013/067709 A1 on 16 May 2013.

TECHNICAL FIELD

The disclosure relates to wireless communication systems, and more particularly, to a scheme of coordinated scheduling downlink transmission from a first node to a user equipment UE.

BACKGROUND

Unless otherwise indicated herein, the approaches described in this section are not prior art to the claims in this application and are not admitted to be prior art by inclusion in this section.

During the last couple of years the following trends have however become apparent:
  UE capabilities and processing power have increased considerably. This is driven both by the development of the long-term evolution (LTE) in order for supporting high peak data rates and the multi-carrier (MC) evolution within WCDMA/HSPA.
  The user demand for high peak data rates and operators' desire to manage their wireless resources efficiently have (and continue to) increased. This is a consequence of that mobile operators have started to rely on WCDMA/HSPA/LTE technology to offering mobile broadband services.

Figure 1:
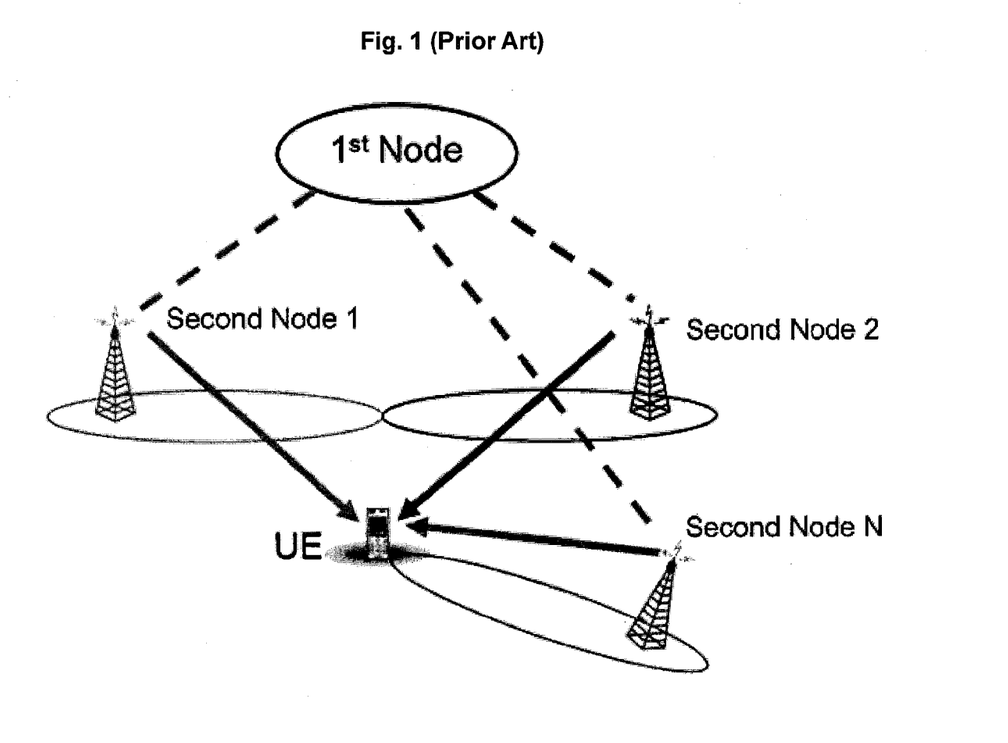
FIG. 1 shows one inter-site multi-point transmission structure, which includes a first radio network node ("1st Node" for short) and a number of second radio networks nodes ("Second Node 1", . . . , "Second Node N" for short).

FIG. 1 shows one inter-site multi-point transmission structure, which includes the first radio network node ("1st Node" for short) and a number of second radio networks nodes ("Second Node 1", . . . , "Second Node N" for short). Each second radio network node or point transmits different data blocks to the same User Equipment (UE). The first node and the second nodes are logical nodes, which can physically be standalone nodes or part of other network nodes. They can even be co-located in the same site or can be located separately. The first node can be the controlling node, which controls and manages the second nodes. The second nodes can be the radio node equipped with radio transmitter and receiver. Moreover, a second node also has functionality to schedule the data for UEs served by this node. The first node splits the data among different second nodes which in turn eventually transmit it to the UE. Thus each second node schedules and transmits the data received from the first node to the same UE. On the UE side, the data blocks received from all the second nodes are separated and reordered according to special services.

The general architecture shown in FIG. 1 is applicable to any radio access technology using multi-point transmission. For example, the structure shown in FIG. 1 is applicable to HSPA, LTE, GERAN, CDMA2000, or any combination of RATs. As another example, the general architecture is also applicable to multi-RAT multi-point transmission e.g. LTE+HSPA.

A third network node is any node which can be connected to the first and/or second node. But third node is not directly involved in multi-point transmission. Examples of third node include OSS, SON, MDT, and the like.

MP-HSDPA is one example of the inter-site multi-point transmission illustrated in FIG. 1. These observations have triggered discussions in the Third Generation Partnership Project (3GPP) on standardizing support for multi-cell transmissions to improve the downlink experience for UEs at the cell edge. In case of HSPA, the 3GPP technical report is available for MP-HSDPA (Reference [1]). In the following, the MP-HSDPA is briefly introduced.

The multi-point transmission for LTE was investigated in (Reference [2]). It is being currently standardized for LTE in Rel-11.

The terms, "coordinated multi-point (COMP) operation" and "multi-point transmission" are interchangeably used with the same meaning in the present disclosure.

The multi-cell transmissions techniques in HSDPA discussed during 2010 include:
1. Switched Transmit Diversity Techniques (e.g., HS-DDTx or SF-DC-HSDPA switching): This class of techniques is based on that HSDPA transmissions from different cells are coordinated so that the inter-cell interference is minimized; thereby a virtual ("soft") reuse factor is introduced.
2. Multi-Flow Transmission Techniques (e.g. SF-DC-HSDPA aggregation): This class of techniques is based on that several, independent data streams are transmitted to the same UE from different cells located in the same or different sites. The gains associated with this class of techniques stems from "spatial resource pooling".
3. Single Frequency Network Transmissions (e.g. HS-SFN): This technique is based on that identical data to the same UE from multiple cells simultaneously. This technique is based on that the transmitted data is combined in the "air" and the UE will consequently benefit from a stronger received signal.

The multi-cell transmission can also be multi-frequency multi-cell HSDPA (MF-MC-HSDPA). A special case of MF-MC-HSDPA is DF-DC-HSDPA in which two independent data streams are transmitted over two different carrier frequencies to the same UE from the cells located in the same or different sites.

Figure 2:
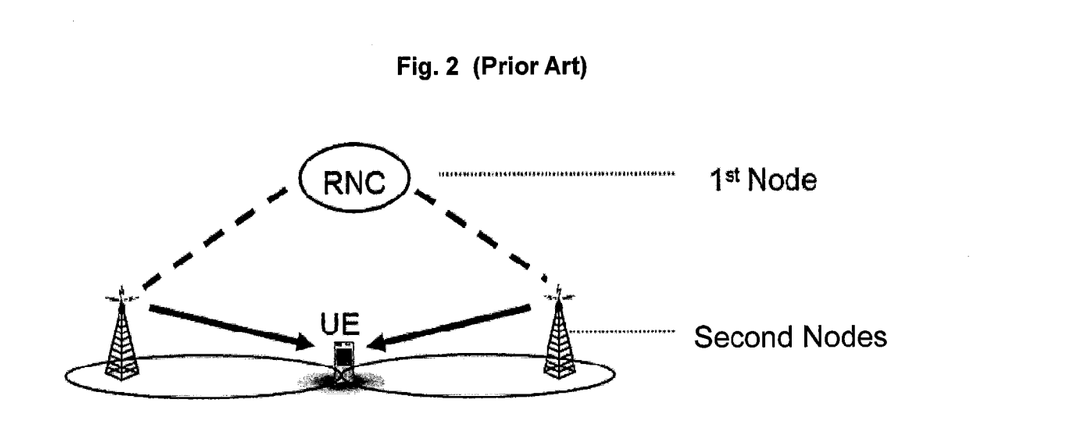
FIG. 2 illustrates the MP-HSDPA structure, where the first node is RNC and the second nodes are two Node Bs.

FIG. 2 illustrates the MP-HSDPA structure, where the first node is RNC and the second nodes are two Node Bs. MP-HSDPA is being currently standardized in Rel-11. SF-DC-HSDPA is the most promising among these possible choices. There are two modes in the SF-DC-HSDPA, SF-DC Aggregation and SF-DC Switching.

SF-DC Aggregation
  Either or both of dual cells can simultaneously transmit different transport blocks to the same UE.
  The two cells can belong to the same NodeB (Intra-NodeB aggregation) or different NodeBs (Inter-NodeB aggregation).
  The SF-DC UE with advanced receiver can gain from this approach by suppressing interference between flows.
SF-DC Switching
  Only one of dual cells can transmit data block to the UE at a certain TTI.
  Better cell is selected to transmit data (e.g. a cell with higher CQI).

The H-ARQ retransmission to a UE can be scheduled in either cell.

The UE with less advanced receiver can also gain from this approach.

The SF-DC in 3GPP is already extended to DF-DC/DF-4C, which is similar but with more frequencies and more cells.

For a UE in SF-DC-HSDPA mode, the network should distribute the data proportionally to the achievable rates in two different cells in order to ensure the in-sequence delivery of RLC layer packets on the UE side.

Figure 3:
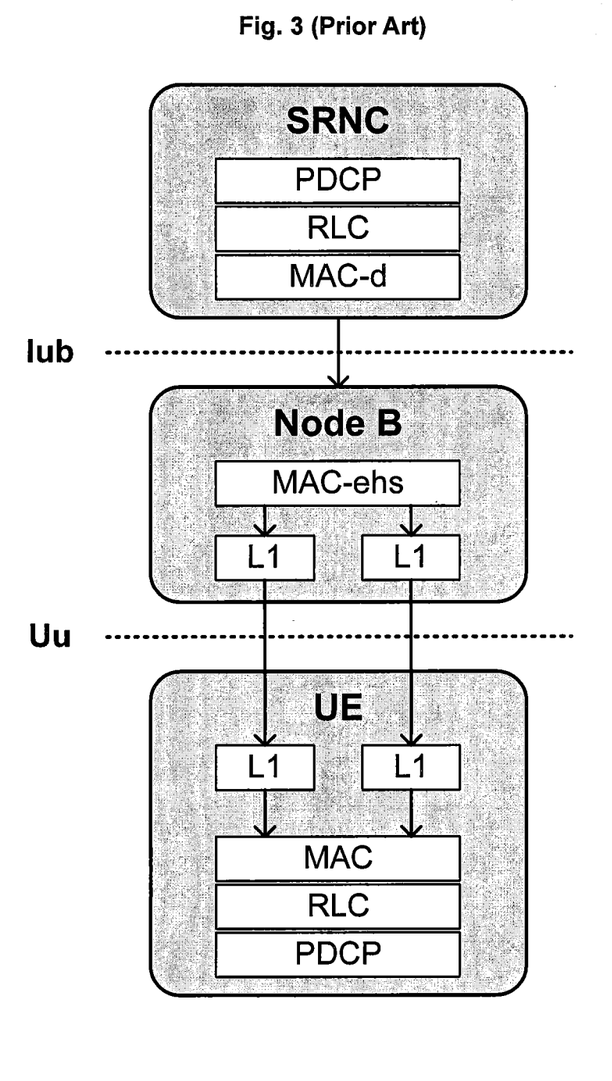
FIG. 3 illustrates the data split in the Node B on MAC-ehs level.

In case of the intra-site SF-DC HSDPA, the data can be easily split by the Node B at the MAC-ehs layer according to the scheduled radio resources. This means the data splitting at the MAC-ehs layer can match the achievable data rate in the air interface pretty well in both the HS-DSCH serving cell and the second HS-DSCH serving cell. The in-sequence delivery of RLC layer packets is not deteriorated. FIG. 3 illustrates the data split in the Node B on MAC-ehs level.

In case of the inter-site SF-DC, the data has to be split by the RNC. There are several proposals to split the data to 2 sites. Two typical examples are listed below.

1. Data Splitting On RLC Level

Figure 4A:
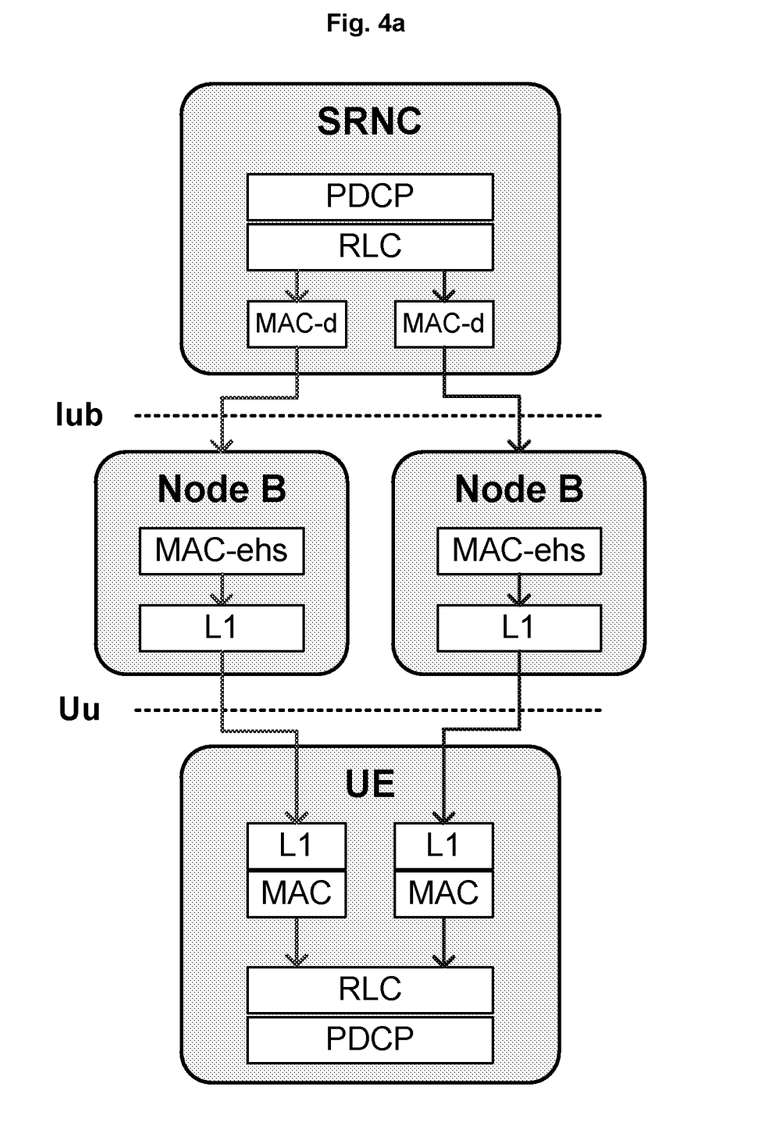
FIG. 4a illustrates the data splitting on RLC level.

According to this method, the RNC splits the data for the 2 sites in RLC layer according to the corresponding data rates that can be guaranteed by these 2 sites. FIG. 4a illustrates the data splitting on the RLC level.

2. Data Splitting On PDCP Level

Figure 4B:
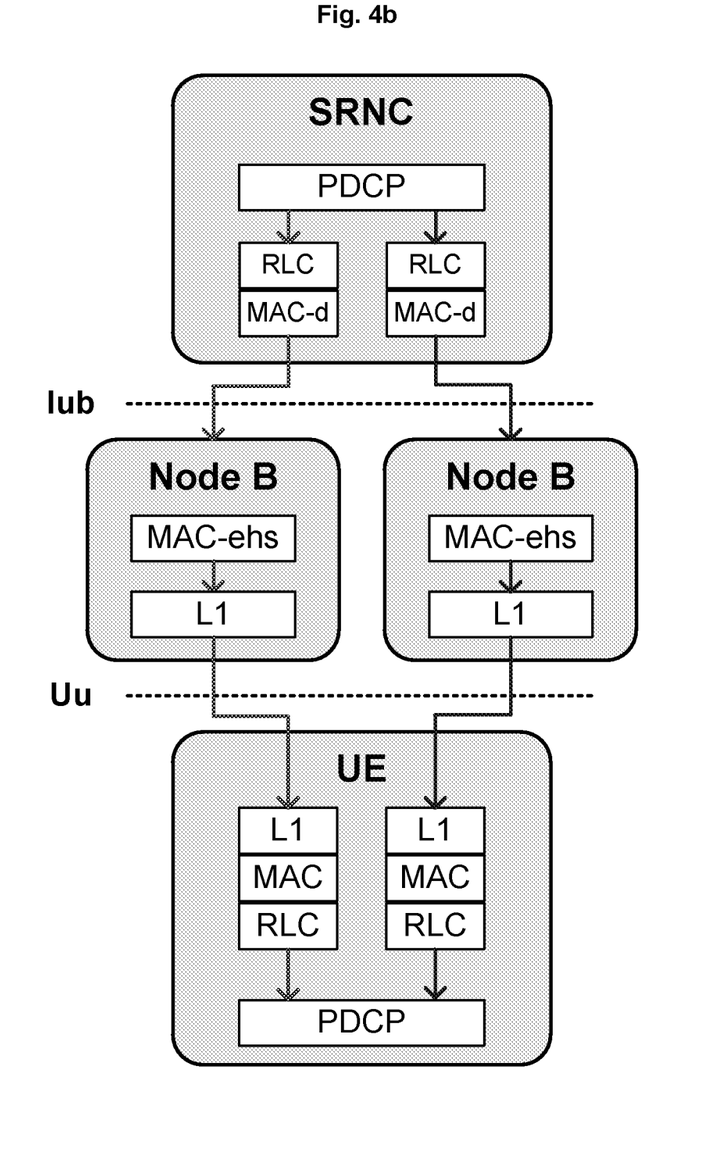
FIG. 4b illustrates the data splitting on PDCP level.

According to this method, the RLC layer splits the RLC PDUs for transmission by the 2 sites according to the corresponding data rates that can be guaranteed by these 2 sites. FIG. 4b illustrates the data splitting on the PDCP level.

The scheduling priorities of SF-DC-HSDPA UEs are typically lower than the non-SF-DC-HSDPA UEs, due to that the SF-DC-HSDPA UEs suffer from bad channel quality. Moreover, due to interference between the two simultaneous data streams from the two HS-DSCH serving cells, a SF-DC-HSDPA UE statistically has low radio resource utilization efficiency compared to non-SF-DC-HSDPA UE. According to the assumptions used in 3GPP simulations, the SF-DC-HSDPA UEs can be scheduled in a HS-DSCH service cell only when there are still radio resources left after all other schedulable UEs are scheduled. The achievable data rate in a HS-DSCH serving cell for a SF-DC-HSDPA UE relies not only on the channel variation of this SF-DC UE but also many other factors in the HS-DSCH serving cell: the downlink traffic load change, the radio channel variation of other UEs, the inter-cell interference variation. Hence for a SF-DC-HSDPA UE, the achievable data rate in a HS-DSCH serving cell can quickly change with large variation.

In LTE the multi-point transmission, which is more commonly called as CoMP is similar to that in HSDPA. However different terminologies are used in LTE and thus CoMP or multi-point transmission in LTE may be categorized into one of the following categories:

Joint Processing (JP): Data for a UE is available at more than one point in the CoMP cooperating set (definition below) for a time-frequency resource. To achieve this simultaneous data transmission from multiple points (part of or entire CoMP cooperating set) to a single UE or multiple UEs in a time-frequency resource (e.g. resource blocks) takes place. In one scenario the data to a UE is simultaneously transmitted from multiple points, e.g. to (coherently or non-coherently) improve the received signal quality and/or data throughput. In another scenario the data transmission from one point (within the CoMP cooperating set) in a time-frequency resource. The transmitting/muting point may change from one subframe to another including varying over the RB pairs within a subframe. Data is available simultaneously at multiple points.

Coordinated Scheduling/Beamforming (CS/CB): Data for an UE is only available at and transmitted from one point in the CoMP cooperating set (DL data transmission is done from that point) for a time-frequency resource but user scheduling/beamforming decisions are made with coordination among points corresponding to the CoMP cooperating set. The transmitting points are chosen semi-statically.

Hybrid category of JP and CS/CB may be possible: Data for a UE may be available only in a subset of points in the CoMP cooperating set for a time-frequency resource but user scheduling/beamforming decisions are made with coordination among points corresponding to the CoMP cooperating set. For example, some points in the cooperating set may transmit data to the target UE according to JP while other points in the cooperating set may perform CS/CB.

In LTE the handling of higher layer packet or more specifically the splitting of higher layer packets (e.g. RLC, PDPC level packets etc) for joint processing or coordinated scheduling/beamforming combination thereof can be performed in a suitable network node. The example of suitable network node which can perform such functions is one of the eNode B involved in the CoMP, a separate radio network node controlling or managing nodes involved in CoMP. Such eNode B or any controlling network node may be termed as a primary node or primary eNode B, a master node or a master eNode B.

For the sake of simplicity a generic term 'coordinated scheduling of a downlink transmission flow' is used in the disclosure. However it should be noted that such a term includes all different types of multipoint transmission schemes in HSPA, LTE and also in other technologies including multi-RAT multipoint transmission scenario.

SUMMARY

In case of the inter-site multi-point transmission (e.g., SF-DC-HSDPA), the data splitting in the RNC cannot follow the variation of the achievable data rates in the corresponding transmission points (e.g., HS-DSCH serving cells in case of SF-DC), the packets from the transmission points can experience large delay differences, which deteriorates the in-sequence delivery of the packets. This further means that:

The packets with a too large delay have to be discarded and the corresponding data has to be retransmitted by higher or higher layers.

The loss of packets can result in a lowered transmission data rate by the higher layers. For instance, the TCP entity decreases the data rate by half once a TCP packet is not acknowledged.

The gain from inter-site SF-DC-HSDPA is negatively impacted by such transmission delay difference over the air interface between HS-DSCH cells.

To solve the above problems, this disclosure describes methods to coordinate the transmission delay over the air interface between the second nodes to ensure the in-sequence delivery of the received packet for an inter-site multi-point UE as well as to minimize the impact on the non-multi-point UEs. This disclosure further includes the following embodiments:

Coordinated scheduling of downlink inter-site multi-point transmission in second nodes According to this embodiment, the downlink schedulers of the second nodes in different sites which serve the multi-point UE should target a predefined transmission delay (i.e. queuing delay+transmission delay) or a predefined/configured data rate over the air interface by adapting the scheduling priority of SF-DC UEs.

Exchanging signaling between first and second nodes for inter-site multi-point transmission According to this embodiment, the signaling and procedure are presented to coordinate the rate control between the first nodes, the second nodes, and the inter-site multi-point UE.

Using acquired information from the second nodes in the first node for configuration of radio network parameters According to this embodiment, 1) the first node splits the data according to the acquired information from the second nodes; 2) adjusts the scheduling priority levels of the services; 3) adjusts the timer values or other radio network parameters.

Signaling the information to third network nodes

Using the acquired information in third node for network management tasks

E.g. network planning, tuning of parameters related to multi-point (MP) transmission, and so on.

In a first embodiment, there provides a method of coordinated scheduling of a downlink transmission flow from a first radio network node to a user equipment UE in a second radio network node. The method may include a step of: scheduling the downlink transmission flow so that the in-sequence delivery of the received data blocks can be kept in an acceptable level in the UE by adjusting a scheduling priority of the downlink transmission flow in the second radio network node.

The method may further include steps of: estimating one or more buffer-related parameters based on buffered data for the downlink transmission flow from the first radio network node; and determining, based on the estimated one or more buffer-related parameter, if the in-sequence delivery of the received data blocks to higher layers can be in an acceptable level in the UE.

The estimating of one or more buffer-related parameters may be further based on one or more parameters associated with the operation status of the second radio network node. In which, the parameter associated with the operation status is one or more of the data rate, transmission delay, a transmission power, and/or the like.

In a second embodiment, there provides a method of coordinated scheduling at least a first and a second flows of a downlink transmission from a first radio network node to a user equipment UE in the first radio network node, each of the at least first and second flows being transmitted through one of second radio network nodes. The method may include a step of: scheduling the at least first and second flows so that the in-sequence delivery of the received data blocks can be kept in an acceptable level in the UE by adjusting a scheduling priority of one or more of the at least first and second flows in the corresponding second radio network nodes.

The method may further include steps of: receiving one or more buffer-related parameters for the UE from the second radio network nodes; and determining, based on the received one or more buffer-related parameters, if the in-sequence delivery of the received data blocks to higher layers can be in an acceptable level in the UE.

In a third embodiment, there provides a method of coordinated scheduling at least a first and a second flows of a downlink transmission from a first radio network node to a user equipment UE in the first radio network node, each of the at least first and second flows being transmitted through one of second radio network nodes, the method including steps of: receiving scheduling priorities of UEs from the second radio network nodes; splitting data blocks of the downlink transmission into the at least a first and a second flows based on the received scheduling priorities of UEs; and transmitting the at least first and second flows to the corresponding second radio network nodes, so that the in-sequence delivery of the received data blocks can be kept in an acceptable level in the UE.

In a fourth embodiment, there provides a method of coordinated scheduling at least a first and a second flows of a downlink transmission from a first radio network node to a user equipment UE in the first radio network node, each of the at least first and second flows being transmitted through one of second radio network nodes, the method including steps of: receiving scheduling priorities of UEs from the second radio network nodes; and configuring one or more parameters associated with the operation status of the second radio network nodes based on the received scheduling priorities of UEs, so that the in-sequence delivery of the received data blocks can be kept in an acceptable level in the UE.

The parameter associated with the operation status is one or more of the data rate, transmission delay, a transmission power, and/or the like.

The method according to any of the above embodiments may further include a step of: reporting information related to coordinated scheduling downlink transmission from the first and/or second radio network node to a third network node.

The reported information related to coordinated scheduling downlink transmission may include one or more of: rate control parameter values, adjusted scheduling priorities of UEs, BS measurements used for adjusting the parameters associated with the coordinated scheduling, and/or second radio network node's capability of supporting rate control mechanism for coordinated scheduling.

The reported information related to coordinated scheduling downlink transmission can be used by the third node for one or more of the network management tasks: monitoring network performance, configuring ratio related parameters, and/or network planning and deployment.

In a fifth embodiment, there provides a computer-readable storage medium having computer-readable instructions to facilitate coordinated scheduling of a downlink transmission flow from a first radio network node to a user equipment UE stored thereon. that are executable by a computing device to carry out the method according to any one of the first to fourth embodiments.

In a sixth embodiment, there provides a second radio network node, including: a scheduler configured to schedule a downlink transmission flow from a first radio network node to a user equipment UE so that the in-sequence delivery of the received data blocks can be kept in an acceptable level in the UE by adjusting a scheduling priority of the downlink transmission flow in the second radio network node.

The second radio network node may further include an estimator configured to estimate one or more buffer-related parameters based on buffered data for the downlink transmission flow from the first radio network node; and a determiner configured to determine, based on the estimated one or more buffer-related parameter, if the in-sequence delivery of the received data blocks to higher layers can be in an acceptable level in the UE.

The estimator may be further configured to estimate the one or more buffer-related parameters further based on one or more parameters associated with the operation status of the second radio network node. In which, the parameter associated with the operation status may be one or more of the data rate, transmission delay, a transmission power, and/or the like.

The determiner may be further configured to determine, based on the one or more buffer-related parameters, that the in-sequence delivery of data blocks to the higher layers in the UE can reach an acceptable level even without adjusting the scheduling priority of the flow in the second radio network node, or that there may be out-of-sequence delivery of the received data blocks to the higher layers in the UE with adjusting the scheduling priority of the flow in the second radio network node, and the scheduler may be further configured to reset the scheduling priority of the flow to an original scheduling priority in the second radio network node, or recalculate the scheduling priority of the flow without considering the scheduling priority adjustment.

In a seventh embodiment, there provides a first radio network node, including: a scheduler configured to schedule at least a first and a second flows of a downlink transmission from the first radio network node to a user equipment UE, each of the at least first and second flows being transmitted through one of second radio network nodes, so that the in-sequence delivery of the received data blocks can be kept in an acceptable level in the UE by adjusting a scheduling priority of one or more of the at least first and second flows in the corresponding second radio network nodes.

The first radio network node may further include: a receiver configured to receive one or more buffer-related parameters for the UE from the second radio network nodes; and a determiner configured to determine, based on the received one or more buffer-related parameters, if the in-sequence delivery of the received data blocks to higher layers can be in an acceptable level in the UE.

The determiner may be further configured to determine, based on the received one or more buffer-related parameters, that the in-sequence delivery of data blocks to the higher layers in the UE can reach an acceptable level even without adjusting the scheduling priority of the flow in the second radio network node, or that there may be out-of-sequence delivery of the received data blocks to the higher layers in the UE with adjusting the scheduling priority of the flow in the second radio network node, and the scheduler may be further configured to reset the scheduling priority of the one or more of the at least first and second flows to an original scheduling priority in the corresponding second radio network nodes, or recalculate the scheduling priority of the one or more of the at least first and second flows without considering the scheduling priority adjustment.

In an eighth embodiment, there provides a first radio network node for coordinated scheduling at least a first and a second flows of a downlink transmission from a first radio network node to a user equipment UE in the first radio network node, each of the at least first and second flows being transmitted through one of second radio network nodes, the first radio network node including: a receiver configured to receive scheduling priorities of UEs from the second radio network nodes; a splitter configured to split data blocks of the downlink transmission into the at least a first and a second flows based on the received scheduling priorities of UEs; and a transmitter configured to transmit the at least first and second flows to the corresponding second radio network nodes, so that the in-sequence delivery of the received data blocks can be kept in an acceptable level in the UE.

In a ninth embodiment, there provides a first radio network node for coordinated scheduling at least a first and a second flows of a downlink transmission from a first radio network node to a user equipment UE in the first radio network node, each of the at least first and second flows being transmitted through one of second radio network nodes, the first radio network node including: a receiver configured to receive scheduling priorities of UEs from the second radio network nodes; and a configurator configured to configure one or more parameters associated with the operation status of the second radio network nodes based on the received scheduling priorities of UEs, so that the in-sequence delivery of the received data blocks can be kept in an acceptable level in the UE.

The parameter associated with the operation status may be one or more of the data rate, transmission delay, a transmission power, and/or the like.

The first radio network node can be one or more of radio network controller RNC, primary eNode B, master eNode B, donor node, primary relay, centralized controller, base station controller, and/or the like.

The second radio network node can be one or more of Node B, eNode B, base station BS, relay, and/or the like.

The third network node can be one or more of neighboring radio network node, centralized network node, core network node, operational support systems OSS node, operation, administration and maintenance OAM node, minimization of drive tests MDT node, self organizing network SON node, network monitoring node, and/or the like.

The examples of parameters or quantities which depict, represent or are associated with the operation status of the second radio network node are data rate, transmission delay, a transmission power etc. The quantities which are associated with the operation status can be measured, estimated, expressed or represented in different manner and scales (e.g. linear, arithmetic log scales etc). For example, they can be expressed in terms of statistical values such as mean value or $x^{th}$ percentile. They can also be expressed in terms of instantaneous value. They can also be expressed for different types of flow or for aggregated transmissions for different types of flows.

The embodiment of the present disclosure leads to the following benefits and advantages:
 Ensures in-sequence delivery of the received data blocks to higher layers in the UE operating in inter-site multi-point data transmission mode.
 The transmission delay of data to the inter-site multi-point UEs is reduced.
 The method enables reasonable balance of performance experienced by MP and non-MP UEs.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

The present disclosure is exemplified in the context of MP-HSPA with one RNC (i.e., the first node) and 2 Node Bs (i.e., 2 second nodes) below. The embodiments of the present disclosure are mainly described for MP-HSPA transmission. The disclosure also describes the various aspects with the assumption of dual-cell transmission. However the same principles are also applicable for multi-point transmission comprising of more than 2 cells, e.g. 4-cell HSDPA transmission. Furthermore, the embodiments of the present disclosure can be equally applied in the non-co-located multi-point transmission of other wireless communication systems such as CDMA2000, HRPD, TD-SCDMA, LTE, GSM/EDGE/GERAN and other different network deployments. The embodiments in the present disclosure are also applicable to multi-point transmission comprising of combination of RATS e.g. HSPA+LTE. In this case for instance HSPA and LTE cells are transmitted by non-co-located sites (i.e. non-co-located Node B and eNode B).

Some examples of multi-point transmissions from non-co-located sites are given below but not limited to these examples. The examples of such deployment can be for instance:
RNC+1 macro node+1 macro/micro/pico node of WCDMA-HSDPA technology;
Master eNode B (acting as the first node and one second node logically)+another eNode B;
The involved nodes for the said multi-point transmission can also of different radio access technologies e.g. LTE+HSPA or LTE+CDMA2000.

Coordinated Scheduling of Downlink Inter-Site Multipoint Transmission

According to this embodiment, firstly each second node can evaluate the required time to empty the buffer for an inter-site MP UE. The first node then configures the second nodes with one or more parameters. The second nodes then use one or more configured parameters and/or uses one or more pre-defined parameters for adjusting the scheduling priority of different transmissions whenever necessary. The adjustment of the scheduling priority ensures that the transmission delay to the SF-DC-HSDPA UE is within a certain limit in order to guarantee in-sequence delivery of the received data packets to higher layers in the UE. The scheduling priority can be relatively adjusted between transmission towards SF-DC-HSDPA UE and non-SF-DC-HSDPA UE (e.g. legacy UE). The scheduling priority can even be adjustment between transmissions toward two or more SF-DC-HSDPA UEs. This embodiment is described with a specific example below.

Figure 5:
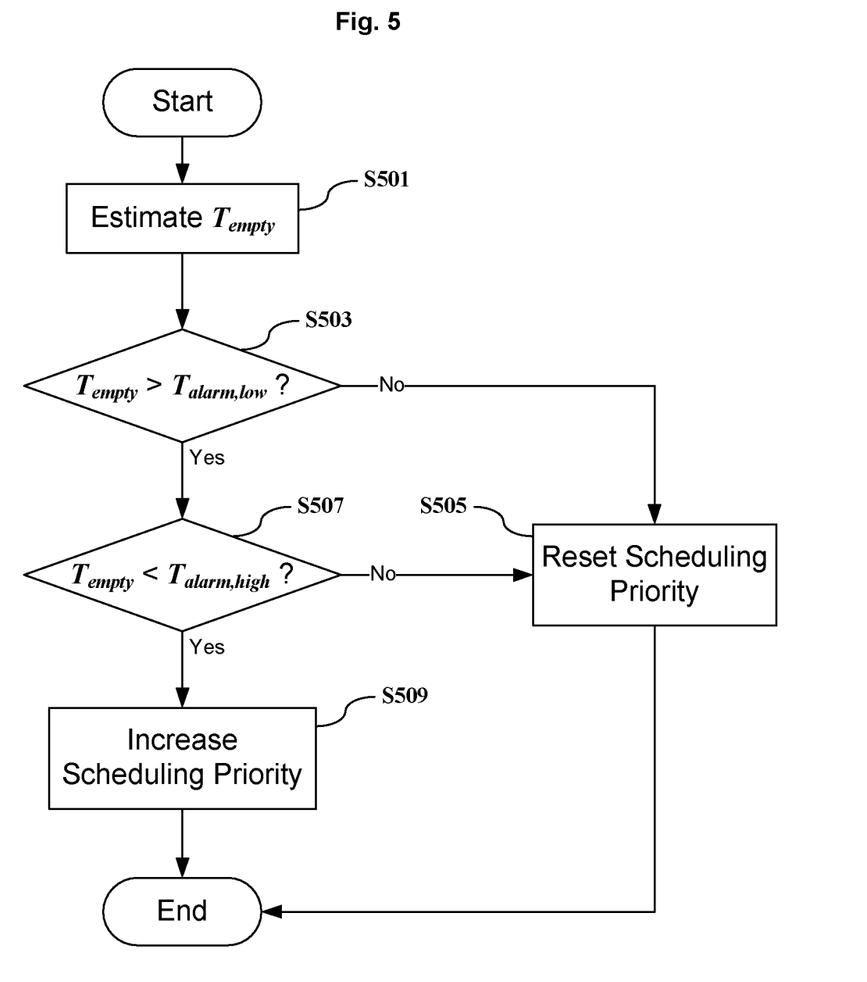
FIG. 5 illustrates a procedure of scheduling priority adaptation of a second node (such as, HS-DSCH serving cell).

FIG. 5 illustrates a procedure of scheduling priority adaptation of a second node (such as, HS-DSCH serving cell). By setting the mentioned parameters properly below, the transmission delay difference between the HS-DSCH serving cells for an inter-site MP-HSDPA UE can be controlled within an acceptable range to reduce out-of-sequence data delivery to higher layers. The related parameters can be different for different HS-DSCH serving cells for the inter-site MP-HSDPA UE depending on the different traffic load, different RATs, etc. The related configured values are expected to ensure that the data blocks transmitted from the RNC to the UE through different HS-DSCH serving cells experience a delay lower than certain predefined or configured delay threshold. In the description below, the target transmission delay is used as an example. Similarly, the method can be used with minor adjusting if a certain target rates are used instead of the target delay, which will not be described in detail but still covered by this embodiment.

As an example, Equation 1 can be used to estimate the required time to empty the buffer (step S501):

$$T_{empty}=N_{dataBits}/\text{averageRate}_{meas} \quad \text{Equation 1}$$

where $T_{empty}$ is the time required to empty the MAC transmit buffer for the inter-site SF-DC-HSDPA UE; $N_{dataBits}$ is the number of buffered data bits in the MAC transmit buffer for the inter-site SF-DC-HSDPA UE; and averageRate$_{meas}$ is the data rate achieved over the air in the HS-DSCH serving cell of the inter-site SF-DC-HSDPA UE. The achieved data rate is based on the data rate measured or determined or estimated over a certain time.

Then the second node compares $T_{empty}$ to the low alarm threshold $T_{alarm,low}$ (step S503). If $T_{empty}$ is equal to or smaller than the low alarm threshold $T_{alarm,low}$ (step S503: No), the transmission delay over the air interface is not problematic and in this case the scheduling priority of the MP UE (if different priorities exist) is reset to its original scheduling priority (step S505). Otherwise, if $T_{empty}$ is larger than the low alarm threshold $T_{alarm,low}$ (step S503: Yes), then the second node further compares the high alarm threshold $T_{alarm,high}$ ($T_{alarm,high}>T_{alarm,low}$) (step S507). If $T_{empty}$ is equal to or larger than the high alarm threshold $T_{alarm,high}$ (step S507: No), then the transmission delay cannot be guaranteed even if the scheduling priority is increased because the amount of the buffered data for the MP UE is too large. As a consequence, the scheduling priority is also reset to its original scheduling priority (step S505). If $T_{empty}$ is smaller than the high alarm threshold $T_{alarm,high}$ (step S507: Yes), the scheduling priority is increased (step S509) to guarantee that the transmission delay is within a certain acceptable level (i.e, ≤$T_{safe}$) to minimize the risk of out-of-sequence data delivery.

The increase of the scheduling priority of a MP UE means to preempt the scheduling opportunity of the other UEs. Some policies should be predefined (for instance, dependent on the type of service) so that the impact on the experience of the service with higher priorities can be minimized/acceptable. It can be acceptable to preempt the scheduling opportunity of some non-delay sensitive services e.g. packet transmission for Web browsing. Meanwhile, it should be avoided to preempt the scheduling opportunity of the services which have higher target QoS compared to the service of the said MP UE.

Apparently, with the time required to empty the MAC transmit buffer for the inter-site SF-DC-HSDPA UE $T_{empty}$, the first node may also directly schedule the flows of one and the same transmission by adjusting the scheduling priority of one or more of the flows in the corresponding second radio network nodes.

Figure 6:
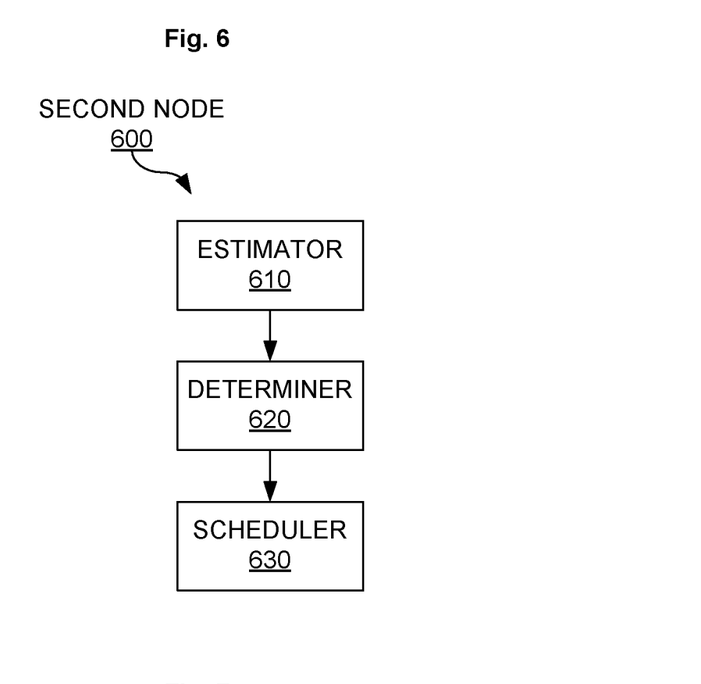
FIG. 6 illustrates a schematic diagram of a second node 600 according to one embodiment of the present disclosure.

FIG. 6 illustrates a schematic diagram of a second node 600 according to one embodiment of the present disclosure. For example, the second node 600 may include one or more of an estimator 610, a determiner 620, and/or a scheduler 630.

As an example, the estimator 610 may be configured to estimate one or more buffer-related parameters (e.g., $T_{empty}$, in step S501 in FIG. 5) based on buffered data (e.g., $N_{dataBits}$ in step S501 in FIG. 5) for a downlink transmission flow from a first node to a user equipment UE. The estimator 610 may be further configured to estimate the one or more buffer-related parameters further based on one or more parameters (e.g., averageRate$_{meas}$ in step S501 in FIG. 5) associated with the operation status of the second node. The parameter associated with the operation status may be one or more of the data rate, transmission delay, a transmission power, and/or the like.

The determiner 620 may be configured to determine, based on the estimated one or more buffer-related parameter, if the in-sequence delivery of the received data blocks to higher layers can be in an acceptable level (e.g., $T_{safe}$ as previously mentioned) in the UE (e.g., steps S503 and S507 in FIG. 5).

The scheduler 630 may be configured to schedule the downlink transmission flow so that the in-sequence delivery of the received data blocks can be kept in an acceptable level in the UE by adjusting a scheduling priority of the downlink transmission flow in the second node (e.g., step S509 in FIG. 5).

The determiner 620 may be further configured to determine, based on the one or more buffer-related parameters, that the in-sequence delivery of data blocks to the higher layers in the UE can reach an acceptable level even without adjusting the scheduling priority of the flow in the second node (e.g., step S503: No in FIG. 5), or that there may be out-of-sequence delivery of the received data blocks to the higher layers in the UE with adjusting the scheduling priority of the flow in the second node (e.g., step S507: No in FIG. 5). In this situation, the scheduler 630 may be further configured to reset the scheduling priority of the flow to an original scheduling priority in the second node, or recalculate the scheduling priority of the flow without considering the scheduling priority adjustment (e.g., step S505 in FIG. 5).

Figure 7:
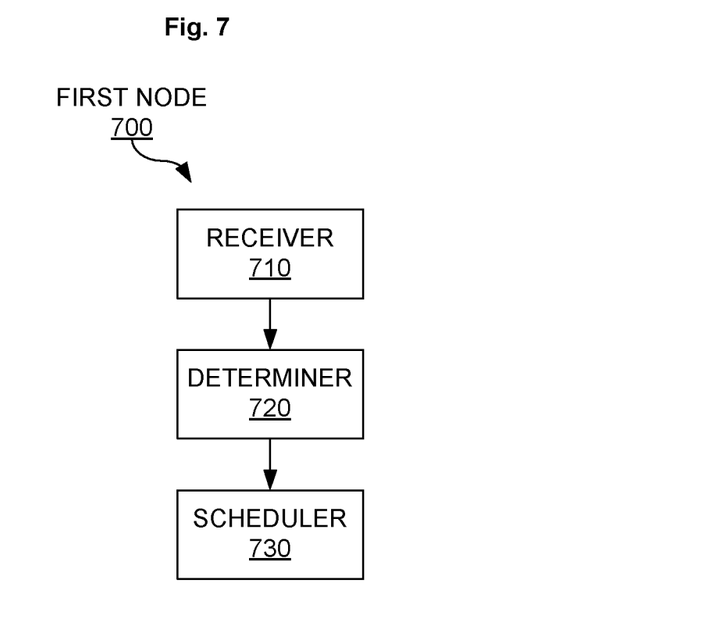
FIG. 7 illustrates a schematic diagram of a first node 700 according to another embodiment of the present disclosure.

FIG. 7 illustrates a schematic diagram of a first node 700 according to another embodiment of the present disclosure. For example, the first node 700 may include one or more of a receiver 710, a determiner 720, and/or a scheduler 730.

As an example, the first node 700 may schedule at least two flows of a downlink transmission from the first node 700 to a UE, and each of the at least two flows is transmitted through one of second nodes (cf. FIG. 2).

The receiver 710 may be configured to receive one or more buffer-related parameters (e.g., $T_{empty}$, in step S501 in FIG. 5) for the UE from the second nodes.

The determiner 720 may be configured to determine, based on the received one or more buffer-related parameters, if the in-sequence delivery of the received data blocks to higher layers can be in an acceptable level (e.g., $T_{safe}$ as previously mentioned) in the UE (e.g., operations similar to steps S503 and S507 in FIG. 5).

The scheduler 730 may be configured to schedule the two flows so that the in-sequence delivery of the received data blocks can be kept in an acceptable level in the UE by adjusting a scheduling priority of one or more of the at least two flows in the corresponding second nodes (e.g., operation similar to step S509 in FIG. 5).

The determiner 720 may be further configured to determine, based on the received one or more buffer-related parameters, that the in-sequence delivery of data blocks to the higher layers in the UE can reach an acceptable level even without adjusting the scheduling priority of the flow in the second node (e.g., operation similar to step S503: No in FIG. 5), or that there may be out-of-sequence delivery of the received data blocks to the higher layers in the UE with adjusting the scheduling priority of the flow in the second node (e.g., operation similar to step S507: No in FIG. 5). In this situation, the scheduler 730 may be further configured to reset the scheduling priority of the one or more of the at least two flows to an original scheduling priority in the corresponding second nodes, or recalculate the scheduling priority of the one or more of the at least two flows without considering the scheduling priority adjustment (e.g., operation similar to step S505 in FIG. 5).

Method to Exchange Signaling Between First and Second Nodes for Inter-Site Multi-Point Transmission The method in second nodes of performing coordinated scheduling, which is described in conjunction with FIG. 5 can be realized by using predefined parameters or by configurable parameters or combination thereof. If only predefined parameters are used then no exchange of signaling between first and second nodes is required for configuring the parameters. But if configurable parameters are used then the first node can configure the second nodes with the parameter values. In both cases, however, the second nodes may still report certain results such as the adjusted priority level between different transmission flows.

Examples of predefined and/or configurable parameters, which can be configured by the first node or reported by the second nodes to the first node or exchanged between the first and second network nodes, are listed below:

First node configuring second nodes with thresholds related to radio transmission e.g. time or bit rate thresholds. The threshold can be different for different types of services, data type, flow type, second node etc.

First node configuring second nodes with thresholds related to maximum allowed priority level for each type of multi-point transmission.

First node configuring second nodes with thresholds related to minimum allowed priority level for each type of non-multi-point transmission.

Second nodes signaling first node the current priority level if changed or statistics related to adjusted priority levels. The reporting can be based on priority level adjusted or changed over certain time, periodic, event triggered or whenever a priority level is changed or whenever priority level is changed outside certain range etc.

A second node reporting its capability to the first node whether it supports the rate control mechanism for handling, managing or performing coordinated scheduling. The capability may depict whether the second node is capable of interpreting the rate control related parameters configured by the first node and use them for coordinated scheduling. The capability may also depict whether the second node is capable of adjusting the scheduling priority and reporting the adjusted priority levels of flows to the first node. The capability may also depict whether the second node is capable of receiving, interpreting and using the parameters associated with the scheduling priority received from the first node. For example, all the second nodes may not support this mechanism and thus may not be able to interpret and apply the configurable parameters received from the first node. The second nodes may even report its capability in terms of the supported coordinated scheduling/rate control mechanism e.g. uses only pre-defined parameters or configurable or combination of both. The capability can be reported by receiving request from the first node or can be sent by the second nodes to the first node proactively e.g. at initial setup.

The signaling of parameters may also depend on different modes of operations in terms of configuration level. Some examples of modes are listed below.

[Mode 1]

The first node enables the coordinated rate control and configures the related parameters.

This mode includes,

The coordinated rate control of inter-site MP UEs can be enabled/disabled by the first node by signaling according to the requirement from the operator. For example, the first node indicates this to second nodes over Iub interface.

The parameters can be configured by the first node. The parameters can be tuned for different services, different radio access networks, and different type/layer of radio access nodes.

The second node is not allowed to activate/de-activate the method disclosed in conjunction with FIG. 5 without receiving an explicit message along with parameters from the first node enabling the coordinated rate control mechanism.

[Mode 2]

The first node enables/disables the coordinated rate control only.

According to this mode, there is only an enabling/disabling message defined. When the method disclosed in conjunction with FIG. 5 is enabled by the first node by this message, the second nodes use the predefined parameters to do coordinated rate control for the inter-site MP UE.

A second node is not allowed to activate/de-activate the method disclosed in conjunction with FIG. 5 without receiving an explicit indication or message from the first node enabling the coordinated rate control mechanism.

[Mode 3]

Second node based activation

Below are some polices of this mode to enable:

The coordinated rate control for an inter-site MP UE is always activated but the second nodes report the priority adjustments to first node; or Each of the second nodes can independently decide whether to activate/deactivate the coordinated rate control for one inter-site MP UE or not according to one or more criteria e.g. according to the load in the second node and/or the type of service of the UE; or The first node configures the range of the additional scheduling priority for each type of services. A second node can adjust the scheduling priority of a MP UE according to one or more predefined rules.

In this Mode 3, the related parameters can be predefined.

[Mode 4]

Activation/configuration by third node

According to this method, the third node (e.g. OAM, OSS, SON etc) can activate/deactivate the coordinated rate control of inter-site MP UEs and/or configure the related parameters according the requirement from the network operation.

[Mode 5]

Any combination of principles employed in Mode 1 to Mode 4.

According to this mode the second nodes use any combination of principles used in two or more modes described above. For example the second nodes uses one or more set of parameters (e.g. delay threshold) based on Mode 1 principle and one or more pre-defined parameters (e.g. pre-defined priority level) based on Mode 2 for performing the coordinated rate control of inter-site MP UEs.

Method in First Node of Using Acquired Information from Second Nodes for Configuration of Radio Network Parameters According to this embodiment, there are following actions in the first node:

The first node may split the data according to the acquired information from the second nodes.

The first node can make use of the existing measurement reports from the second nodes or from the UEs to split the data between the second nodes accordingly for an inter-site MP UE. The examples of measurements are:

Examples of second node measurements, which can be used by the first node for configuring parameters are base station downlink transmit power, base station buffer size, base station hardware resource, base station current hardware resource usage etc.

Examples of UE measurements, which can be used by the first node for configuring parameters are signal strength measurement, signal quality measurements etc. Examples of signal strength measurements are CPICH RSCP in HSPA and RSRP in LTE. Examples of signal quality measurements are CPICH Ec/N0 and carrier RSSI in HSPA and RSRQ in LTE.

In order to adjust or select configurable parameters and to split the data between second nodes, the first node also makes use of the capability of the second nodes in terms of supporting the coordinated scheduling/rate control mechanism. The second node capability or the type of capability in terms of supported scheduling/rate control mechanism is signaled by the second node to the first node as previously described.

In one example, the first node can adjust the data rate for a second node based on the difference between the total measured downlink transmission power and the maximum downlink transmit power of the second node. The first node can increase the data rate for the second node if "maximum downlink transmission power—total downlink transmission power" is larger than a certain predefined threshold. Otherwise, the first node can avoid increasing the data rate for this second node.

In another example, the first node can monitor the RLC retransmission ratio and/or RLC round trip delay (i.e., the time when RLC ACK received—the time when the data sent to a second node) for each second node. If the x-percentile (x can be predefined) RLC round trip delay is larger than a predefined threshold, the first node should be cautious to/avoid increasing data rate for the second node.

The first node adjusts the scheduling priority levels of the services.

According to the overall traffic load and the traffic composing in the second nodes, the service type of an inter-site MP UE, the first node can adjust the additional scheduling priority of the inter-site MP UE accordingly to reduce the out of order delivery of the inter-site MP UE as well as to minimize the impact on the other existing UEs. As an example, a certain table of well additional scheduling priorities can be predefined in the first node so that first node can choose the desired value according to the one or more criteria e.g. traffic load, radio conditions, the type of service of the UE etc. The additional priority parameter can be set with the same or different values for the second nodes for 1) one/all inter-site MP UEs; 2) different services of the inter-site MP UEs.

The first node adjusts the timer values or other radio network parameters.

In one example, the network can adjust the maximum number of HARQ transmission attempts or the number of target transmission attempts of the second nodes to coordinate the transmission delay of different second nodes. In another example, it can be predefined that the packet retransmitted by the RLC layer is additionally protected in HARQ transmission. In yet another example, there can be an additional power increase for the retransmitted packet by the RLC layer. In yet another example, the first node can adjust the T1 timer period when the RLC retransmission window is not likely to stall.

Figure 8:
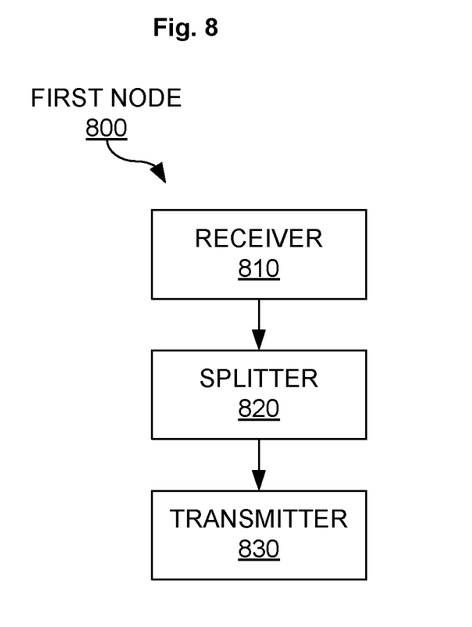
FIG. 8 illustrates a schematic diagram of a first node 800 according to yet another embodiment of the present disclosure.

FIG. 8 illustrates a schematic diagram of a first node 800 according to yet another embodiment of the present disclosure. For example, the first node 800 may include one or more of a receiver 810, a splitter 820, and/or a transmitter 830.

As an example, the first node 800 may schedule at least two flows of a downlink transmission from the first node 800 to a UE, and each of the at least two flows is transmitted through one of second nodes (cf. FIG. 2).

The receiver 810 may be configured to receive scheduling priorities of UEs from the second nodes.

The splitter 820 may be configured to split data blocks of the downlink transmission into the at least two flows based on the received scheduling priorities of UEs.

The transmitter 830 may be configured to transmit the at least two flows to the corresponding second nodes, so that the in-sequence delivery of the received data blocks can be kept in an acceptable level in the UE.

Figure 9:
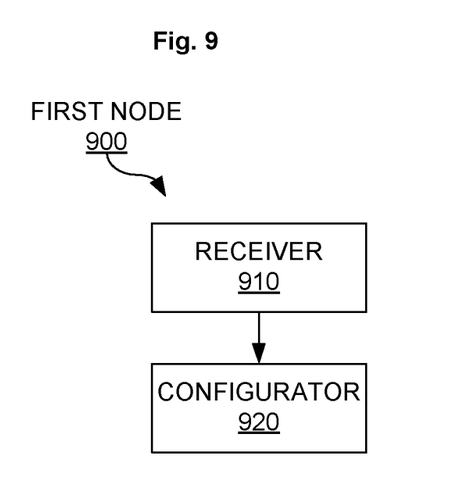
FIG. 9 illustrates a schematic diagram of a first node 900 according to still another embodiment of the present disclosure.

FIG. 9 illustrates a schematic diagram of a first node 900 according to still another embodiment of the present disclosure. For example, the first node 900 may include one or more of a receiver 910, and/or a configurator 920.

As an example, the first node 900 may schedule at least two flows of a downlink transmission from the first node 900 to a UE, and each of the at least two flows is transmitted through one of second nodes (cf. FIG. 2).

The receiver 910 may be configured to receive scheduling priorities of UEs from the second nodes.

The configurator 920 may be configured to configure one or more parameters associated with the operation status of the second nodes based on the received scheduling priorities of UEs, so that the in-sequence delivery of the received data blocks can be kept in an acceptable level in the UE. The parameter associated with the operation status may be one or more of the data rate, transmission delay, a transmission power, and/or the like.

Method in First and/or Second Nodes of Signaling Information to Third Nodes

The first and/or second radio network nodes (e.g. serving radio network node) have information related to the coordinated rate control/scheduling method used for scheduling inter-site MP UEs as described in preceding sections e.g. rate control parameter values, adjusted priorities of MP and/or non-MP UEs, type of service of a UE and/or BS measurements used for adjusting the parameters associated with the coordinated rate control/scheduling method, second node capability of supporting coordinated rate control/scheduling method etc.

According to this embodiment the first and/or second network nodes (e.g. RNC, Node B, eNode B, relay, donor node, BS, master eNode B etc) may signal the above mentioned information related to the coordinated rate control/scheduling mechanism used for MP UEs to other network nodes i.e. third network node. The third network node is not directly involved in multi-point transmission. The third network node is connected to first and/or second nodes via standardized or proprietary interface. The third node can be a radio network node, a node in core network or even a network outside the radio and core network. Examples of third network nodes are:

Neighboring radio network node e.g. controlling RNC, neighboring RNC, Node B, eNode B, BS, relay, donor node etc.

Any centralized network node e.g. MDT node, SON node, network monitoring and planning node, O&M node, OSS node etc.

Core network node e.g. MME, access gateway etc.

For example in HSPA, the RNC (i.e. first node) may signal this information to other RNC over Iur interface. Similarly for example in LTE, the eNode B may signal this information to other eNode B over the X2 interface. Another example is that of the relay node signaling this information to another relay node (e.g. in multi-hop relay system but also applies to single hop relay system) or relay node signaling this information to the donor BS e.g. LTE relay node signaling this information to its donor eNode B. Similarly the eNode B in LTE may signal the above mentioned information to the MME over S1. In HSPA the RNC may signal this information to another RNC over Iur interface.

Similarly any first and/or second network node may signal the above mentioned information to any other centralized node such as MDT, SON, OSS, OAM etc.

The first or second network node may signal the above mentioned information to any of the third node proactively, at certain pre-defined instance/occasion or upon receiving a request from the target third node. Examples of pre-defined occasion are when sufficient statistics are obtained, during specific time of a day, when certain number of UEs is scheduled for multi-point transmission over certain time etc.

Method in Third Node of Using Acquired Information for Network Management Tasks

The third network nodes use the information related to the coordinated rate control/scheduling acquired from the first and/or second node for one or more of the following network management tasks:

Monitoring Network Performance: The centralized or any third radio network node may use the acquired information (e.g. statistics) for monitoring the network performance, network behavior, MP and non-MP UEs' performances and their achieved QoS etc.

Configuring Radio Related Parameters: The relevant third node (e.g. centralized radio network node) may use the acquired information for configuring the appropriate radio related parameters to facilitate coordinated rate control/scheduling. For example, it may update the admission control related parameters to set a balance between MP UEs and non-MP UEs in cell(s). The third node may also update the scheduling related parameters to improve scheduling of MP and non-MP UEs.

Network Planning and Deployment: The centralized or any third radio network node may use the obtained information for planning, dimensioning, deployment of network nodes, identification of location to deploy or modification (e.g. upgrading) of different features such as carrier aggregation, configuration and setting of network parameters such as carrier frequencies, frequency bands, bandwidth selection in case of LTE etc.

Other arrangements of the present disclosure include software programs performing the steps and operations of the method embodiments, which are firstly generally described and then explained in detail. More specifically, a computer program product is such an embodiment, which comprises a computer-readable medium with a computer program logic encoded thereon. The computer program logic provides corresponding operations to provide the above described downlink transmission coordinated scheduling scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g. CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g. a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP 3rd Generation Partnership Project
ACK Acknowledgment
CDMA2000 Code Division Multiple Access 2000
CoMP Coordinated Multi-point
DF-DC-HSDPA Dual-Frequency Dual-Cell HSDPA
GERAN GSM EDGE Radio Access Network
HARQ Hybrid Automatic Repeat reQuest
HRPD High Rate Packet Data
HSPA High Speed Packet Access
HS-DDTx HSDPA Data-Discontinuous Transmission
HSDPA High Speed Downlink Packet Access
HS-DSCH High Speed Downlink Shared Channel
HS-SFN High Speed Single Frequency Network
LTE Long-Term Evolution
MAC Media Access Control
MDT Minimization of Drive Tests
MF-MC-HSDPA Multi-Frequency Multi-Cell HSDPA
MP-HSDPA Multi-Point HSDPA
MP Multi-Point
OAM Operation, Administration and Maintenance system
OSS Operational Support Systems
PDCP Packet Data Convergence Protocol
PDU Packet Data Unit
QoS Quality of Service
RAT Radio Access Technology
RLC Radio Link Control
RNC Radio Network Controller
RRC Radio Resource Control
RSCP Received Signal Code Power
RSRP Reference Signal Receiving Power
RSRQ Reference Signal Receiving Quality
RSSI Received signal strength indicator
SF-DC-HSDPA Single Frequency Dual-Cell HSDPA
SON Self Organizing Network
TCP Transmission Control Protocol
TD-SCDMA Time Division-Synchronous Code Division Multiple Access
TTI Transmission Time Interval
UE User Equipment
WCDMA Wideband Code Division Multiple Access

REFERENCES

[1] 3GPP TR 25.872, High Speed Packet Access (HSDPA) multi-point transmission (Release 11)
Available: http://www.3gpp.org/ftp/Specs/html-info/25872.htm
[2] 3GPP TR 36.819, Coordinated multi-point operation for LTE physical layer aspects (Release 11)
Available: http://www.3gpp.org/ftp/Specs/html-info/36819.htm

What is claimed is:

1. A method of coordinated scheduling of a downlink transmission flow from a first radio network node to a user equipment UE in a second radio network node, the method comprising steps of:
scheduling the downlink transmission flow so that in-sequence delivery of received data blocks can be kept in an acceptable level in the UE by adjusting a scheduling priority of the downlink transmission flow in the second radio network node;
determining, based on one or more buffer-related parameters, that in-sequence delivery of data blocks to higher layers in the UE can reach an acceptable level even without adjusting scheduling priority of the downlink transmission flow in the second radio network node, or that there may be out-of-sequence delivery of received data blocks to the higher layers in the UE with adjusting the scheduling priority of the downlink transmission flow in the second radio network node; and resetting the scheduling priority of the downlink transmission flow to an original scheduling priority in the second radio network node, or recalculating the scheduling priority of the downlink transmission flow without considering the scheduling priority adjustment.

2. The method according to claim 1, further comprising steps of:

estimating one or more buffer-related parameters based on buffered data for the downlink transmission flow from the first radio network node; and determining, based on the estimated one or more buffer-related parameter, if the in-sequence delivery of the received data blocks to higher layers can be in an acceptable level in the UE.

3. The method according to claim 2, wherein the estimating of one or more buffer-related parameters are further based on one or more parameters associated with the operation status of the second radio network node.

4. The method according to claim 3, wherein the parameter associated with the operation status is one or more of data rate, transmission delay, and a transmission power.

5. The method according to claim 1, wherein the scheduling priority of the downlink transmission flow is adjusted by increasing the scheduling priority of the downlink transmission flow based on a type of the downlink transmission from the first radio network node to the UE.

6. The method according to claim 1, further comprising a step of:

reporting current scheduling priority of the UE and/or statistics related to scheduling priorities of UEs to a first radio network node.

7. The method according to claim 6, wherein a size and/or the number of the data blocks for the UE transmitted from the first radio network node to a second radio network node are controlled based on the reported current scheduling priorities of the UE.

8. The method according to claim 6, wherein one or more parameters associated with operation status of the second radio network nodes is controlled by the first radio network node based on reported current scheduling priority of the UE and/or reported statistics related to scheduling priorities of UEs.

9. The method according to claim 1, wherein the scheduling is performed further based on parameters predefined and/or configured by the first radio network node to the second radio network nodes.

10. The method according to claim 9, wherein the predefined and/or configured parameters include one or more of: a threshold related to radio transmission, a threshold related to maximum allowed priority for each type of multi-point transmission, and/or a threshold related to minimum allowed priority for each type of non-multi-point transmission.

11. The method according to claim 9, wherein the predefined and/or configured parameters are notified by the first radio network node to the second radio network nodes over Iub interface.

12. A method of coordinated scheduling of a downlink transmission flow from a first radio network node to a user equipment UE in a second radio network node, the method comprising steps of:

scheduling the downlink transmission flow so that in-sequence delivery of received data blocks can be kept in an acceptable level in the UE by adjusting a scheduling priority of the downlink transmission flow in the second radio network node, wherein a buffer-related parameter for the UE is a time $T_{empty}$ required for emptying buffered data for the flow in a buffer of the second radio network node, which is calculated based on $$T_{empty} = N_{dataBits}/\text{averageRate}_{meas}$$

where $N_{dataBits}$ is the number of buffered data for the downlink transmission flow in the buffer of the second radio network node, and averageRate$_{meas}$ is data rate achieved for the downlink transmission flow over the air in a serving cell of the second radio network node.

13. The method according to claim 12, wherein if the calculated $T_{empty}$ is larger than a low alarm threshold but smaller than a high alarm threshold, it is determined that the in-sequence delivery of received data blocks can be kept in an acceptable level in the UE with adjusting scheduling priority of the downlink transmission flow in the corresponding second radio network nodes.

14. A method of coordinated scheduling of a downlink transmission flow from a first radio network node to a user equipment UE in a second radio network node, the method comprising steps of:

scheduling the downlink transmission flow so that in-sequence delivery of received data blocks can be kept in an acceptable level in the UE by adjusting a scheduling priority of the downlink transmission flow in the second radio network node, wherein a buffer-related parameter for the UE is a data rate Rate$_{empty}$ required for emptying buffered data for the downlink transmission flow in a buffer of the second radio network node, which is calculated based on $$\text{Rate}_{empty} = N_{dataBits}/T_{desired}$$

where $N_{dataBits}$ is the number of buffered data for the UE in the buffer of the second radio network node, and $T_{desired}$ is a desire time to empty buffered data for the downlink transmission flow.

15. The method according to claim 14, wherein if the calculated data rate Rate$_{empty}$ is larger than a low alarm threshold but smaller than a high alarm threshold, it is determined in-sequence delivery of received data blocks can be kept in an acceptable level in the UE with adjusting the scheduling priority of the downlink transmission flow in the corresponding second radio network node.

16. The method according to claim 1, further comprising a step of:

reporting information related to coordinated scheduling downlink transmission from the first and/or second radio network node to a third radio network node.

17. The method according to claim 16, wherein the reported information related to coordinated scheduling downlink transmission includes one or more of: rate control parameter values, adjusted scheduling priorities of UEs, BS measurements used for adjusting the parameters associated with the coordinated scheduling, and/or second radio network node's capability of supporting rate control mechanism for coordinated scheduling.

18. The method according to claim 16, wherein the reported information related to coordinated scheduling downlink transmission is used by the third radio network node for one or more of: monitoring network performance, configuring ratio related parameters, and network planning and deployment.

19. The method according to claim 1, wherein the first radio network node is one or more of radio network controller RNC, primary eNode B, master eNode B, donor node, primary relay, centralized controller, and base station controller.

20. The method according to claim 1, wherein the second radio network node is one or more of Node B, eNode B, base station BS, and relay.

21. The method according to claim 1, wherein the third radio network node is one or more of neighboring radio network node, centralized network node, core network node, operational support systems OSS node, operation, administration and maintenance OAM node, minimization of drive tests MDT node, self organizing network SON node, and network monitoring node.

22. A second radio network node, comprising:
   a scheduler configured to schedule a downlink transmission flow from a first radio network node to a user equipment UE so that the in-sequence delivery of received data blocks can be kept in an acceptable level in the UE by adjusting a scheduling priority of the downlink transmission flow in a second radio network node;
   an estimator configured to estimate one or more buffer-related parameters based on buffered data for the downlink transmission flow from the first radio network node; and
   a determiner configured to determine, based on the estimated one or more buffer-related parameter, if the in-sequence delivery of the received data blocks to higher layers can be in an acceptable level in the UE,
   wherein the determiner is further configured to determine, based on the one or more buffer-related parameters, that in-sequence delivery of data blocks to higher layers in the UE can reach an acceptable level even without adjusting scheduling priority of the downlink transmission flow in the second radio network node, or that there may be out-of-sequence delivery of received data blocks to the higher layers in the UE with adjusting the scheduling priority of the downlink transmission flow in the second radio network node, and
   the scheduler is further configured to reset the scheduling priority of the downlink transmission flow to an original scheduling priority in the second radio network node, or recalculate the scheduling priority of the downlink transmission flow without considering adjustment of the scheduling priority.

23. The second radio network node according to claim 22, wherein the estimator is further configured to estimate the one or more buffer-related parameters further based on one or more parameters associated with operation status of the second radio network node.

24. The second radio network node according to claim 23, wherein the parameter associated with the operation status is one or more of data rate, transmission delay, and a transmission power.

25. The second radio network node according to claim 22, wherein the second radio network node is one or more of Node B, eNode B, base station BS, and relay.

26. A first radio network node, comprising:
   a scheduler configured to schedule at least a first and a second downlink transmission flows from the first radio network node to a user equipment UE, each of the at least first and second downlink transmission flows being transmitted through one of second radio network nodes, so that in-sequence delivery of received data blocks can be kept in an acceptable level in the UE by adjusting a scheduling priority of one or more of the at least first and second downlink transmission flows in the corresponding second radio network nodes;
   a receiver configured to receive one or more buffer-related parameters for the UE from the second radio network nodes; and
   a determiner configured to determine, based on the received one or more buffer-related parameters, if the in-sequence delivery of the received data blocks to higher layers can be in an acceptable level in the UE,
   wherein the determiner is further configured to determine, based on the received one or more buffer-related parameters, that in-sequence delivery of data blocks to higher layers in the UE can reach an acceptable level even without adjusting the scheduling priority of the one or more of the at least first and second downlink transmission flows in the second radio network node, or that there may be out-of-sequence delivery of the received data blocks to the higher layers in the UE with adjusting the scheduling priority of the one or more of the at least first and second downlink transmission flows in the second radio network node, and
   the scheduler is further configured to reset the scheduling priority of the one or more of the at least first and second downlink transmission flows to an original scheduling priority in the corresponding second radio network nodes, or recalculate the scheduling priority of the one or more of the at least first and second downlink transmission flows without considering the adjustment of the scheduling priority.

* * * * *